(12) United States Patent
Tsuruo et al.

(10) Patent No.: US 6,435,605 B2
(45) Date of Patent: Aug. 20, 2002

(54) VEHICLE SUNROOF DEVICE

(75) Inventors: Ryo Tsuruo; Kenichi Kuriyama; Masaki Ohmori; Nobuo Ito; Yoshifumi Horiuchi; Masanobu Ohtsu; Hiroshi Okada, all of Kanagawa; Yoshihiro Yamashita, Tokyo, all of (JP)

(73) Assignees: Ohi Seisakusho Co., Ltd., Yokohama; Fuji Jukogyo Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/874,051

(22) Filed: Jun. 6, 2001

Related U.S. Application Data

(62) Division of application No. 09/330,014, filed on Jun. 11, 1999, now Pat. No. 6,312,047.

(30) Foreign Application Priority Data

| Jun. 11, 1998 | (JP) | ............................................. | 10-163781 |
| Jun. 11, 1998 | (JP) | ............................................. | 10-163782 |
| Jun. 11, 1998 | (JP) | ............................................. | 10-163783 |
| Jun. 11, 1998 | (JP) | ............................................. | 10-163784 |
| Jun. 15, 1998 | (JP) | ............................................. | 10-167377 |

(51) Int. Cl.[7] ................................................. B60J 7/00
(52) U.S. Cl. .................... 296/213; 296/216.08; 296/223
(58) Field of Search ................................. 296/213, 222, 296/223, 216.06–216.08

(56) References Cited

U.S. PATENT DOCUMENTS

| 4,596,419 | A |   | 6/1986 | Masuda ................... 296/222 X |
| 4,671,565 | A | * | 6/1987 | Grimm et al. .......... 296/213 X |
| 4,995,665 | A |   | 2/1991 | Ichinose et al. ........ 296/223 X |
| 5,795,016 | A | * | 8/1998 | Otake ...................... 296/222 X |
| 5,899,524 | A |   | 5/1999 | Mori et al. ................. 296/222 |

\* cited by examiner

*Primary Examiner*—Dennis H. Pedder
(74) *Attorney, Agent, or Firm*—Foley & Lardner

(57) ABSTRACT

A vehicle sunroof has a tilting lid provided at a front part of an opening formed in a roof of a vehicle. The tilting lid is adapted to be moved vertically at a rear end thereof with lifter mechanisms. A sliding lid is provided at a rear part of the opening supported by sliders adapted to be moved along guide rails disposed on both side edge portions of the opening and is constructed so as to be moved longitudinally through such movements of the sliders. The lifter mechanisms are provided in such a manner as to be oriented laterally at portions facing a rear end of the tilting lid on a laterally oriented cross member disposed so as to extend between front end portions of the left and right guide rails.

1 Claim, 15 Drawing Sheets

VEHICLE SUNROOF DEVICE

This application is a divisional of application Ser. No. 09/330,014, filed Jun. 11, 1999, now U.S. Pat. No. 6,312,047.

BACKGROUND OF THE INVENTION

1. Field of the Invention

The present invention relates to a vehicle sunroof device. A tilting lid is provided at a front part of an opening formed in the roof of a vehicle, which can be moved vertically at a rear end thereof. A sliding lid is provided at a rear part of the opening, which can be moved longitudinally.

2. Description of the Related Art

Conventionally, an example of this type of a vehicle sunroof device is disclosed, for instance, in Japanese Patent Publication No. Hei. 3-73487. This device is constructed such that a tilting lid disposed at a front part of an opening formed in the roof of a vehicle is tilted up by lifter mechanisms, that a sliding lid disposed at a rear part of the opening is slid backward by slider mechanisms slidably fitted in guide rails disposed on both side edge portions of the opening. Further, interlocking means are each provided between a driving wire for driving the slider and the lifter mechanism which the interlocking means are each adapted to be disengaged after the lifter mechanism completes its rising movement and to be coupled together when the lifter mechanism starts to lower, whereby a series of closing operations of the sliding lid can be performed only by the driving wires.

In the aforementioned vehicle sunroof device, however, there is a little drawback in both lifter and slider mechanisms. That is, the lifter mechanisms for tilting the lid and the slider mechanisms for sliding the lid are disposed longitudinally one after another along the both side edges of the roof. Accordingly, the full length of the mechanism portion on each side becomes long in a longitudinal direction. And this becomes disadvantage in that inserting the mechanism portion into the roof from a rear end side of the roof becomes troublesome work. Further, there may be caused a risk for the lifter mechanisms to interfere thereof with a drain groove and a reinforcement member in order to strengthen the roof due to the provision thereof on the both sides of the roof at a front end.

Further, in the another type of conventional vehicle sunroof devices, a sliding lid for opening and closing an opening formed in a roof of a vehicle is longitudinally and slidably mounted on guide rails fixed on both sides of the opening via front and rear sliders. So that, when it is operated from a fully closed position, the sliding lid is first lowered at a rear end thereof by the rear sliders, and then substantially and simultaneously with the lowering operation, the sliding lid is also lowered at a front end thereof by the front sliders. After that, it is slid rearward (Please refer, for instance, Japanese Patent Publication No. Hei. 5-319099).

In a conventional sunroof device such as described above, however, there is a risk that seal members mounted around edges of the opening in the roof. Especially for one at the front edge may be damaged at an earlier time due to frequent rubbing of the sliding lid against the seal member at the front edge of the opening.

In order to eliminate such a risk as described above, it is contemplated that the front end of the sliding lid in addition to a rear end is also lifted and/or lowered independently from the rear end thereof while the sliding lid is being opened or closed. But with the structure like this there would be caused unstable supports of the front and rear ends of the sliding lid, and resulting in the risk that the sliding lid may stagger in lateral directions.

In addition, in a conventional example as described above, since various types of guide means are disposed in parallel laterally of guide rails, the lateral width of the guide rail has to be increased, and this causes a problem that an opening formed in the roof has to be narrowed to an extent equal to such an increase in width.

Further, in a conventional vehicle sunroof device, sliding bodies are slidably attached to guide rails provided on both side edge portions of an opening formed in a roof of a vehicle, and rubber rollers are rotatably supported on the sliding bodies, whereby a movable panel (sliding lid) is moved to an opened state and/or a closed state when the rubber rollers progressively press against bottom sides of movable blocks fixed to the movable panel and production of looseness of respective parts is prevented by eliminating gaps therebetween by biasing the elastic bodies (Please refer, for instance, to Japanese Patent Publication No. Hei. 6-297952).

However, with the conventional sunroof device described above, when the sliding bodies slide along the guide rails in longitudinal directions, the elastic bodies move after the sliding bodies while pressing the bottom side of the movable blocks, and the structure causes a problem that the elastic bodies are subject to wear, the durability thereof thus being deteriorated.

Still further, in such a conventional vehicle sunroof device as shown in FIG. 19, a sliding lid (not shown) formed in a roof of a vehicle is supported on guide rails (a) disposed along both side edge portions of the opening. And the sliding lid has a substantially U-shaped cross section comprising a side wall (a1) on a side facing of the opening and a side wall (a2) on the side facing of the outside of the vehicle in such a manner as to slide in longitudinal directions, and a drain passage for receiving rain drops intruding from the opening into a gutter groove (a3) formed integrally with the guide rail (a). And further, the lid is slidably installed on a horizontal portion (a4) formed at an upper end of the side wall (a2) of the guide rail (a) on the side facing the outside of the vehicle via a shoe (c) in such a manner as to slide in accordance with opening and closing movements of the sliding lid.

In the conventional sunroof device described above, however, since the shoe (c) fixed to the drain (b) is fitted in the horizontal portion (a4) formed in the side wall (a2) of the guide rail (a) on the side facing the outside of the vehicle, the drain (b) has to be placed in such a manner as to bridge the side wall (a1) on the opening side. Accordingly, the height of a portion of the curved drain (b) near the center thereof becomes higher, and both ends of the drain are also raised by the thickness of the shoe (c). Then this causes structure a problem that a height-wise dimension of a storing space between the roof and the ceiling becomes more larger than required. In addition, if the height of the side wall (a1) on the opening side is lowered in order to avoid the drain (b) for interfering with the same side wall, this also causes a problem that the interior of the guide rail (a) and respective parts installed therein are exposed to the interior of the passenger compartment, and then providing unfavorable appearance.

SUMMARY OF THE INVENTION

In view of the above-mentioned problems that are inherent in the conventional art, a first object of the present invention is to provide a vehicle sunroof device that can shorten the longitudinal overall length thereof, so that assembling work can easily be performed and that interference with internal mechanism portions disposed on both sides of a roof at a front part thereof can be prevented.

A second object of the present invention is to provide a vehicle sunroof device in which an interlocking means between a lift mechanism for a tilting lid and a slider mechanism for a sliding lid can securely and smoothly perform engagement and disengagement operations.

A third object of the present invention is to provide a vehicle sunroof device which can eliminate a risk of a front end of a sliding lid rubbing against a seal member when the sliding lid is operated to be lowered at the front end thereof.

A fourth object of the present invention is to provide a vehicle sunroof device that has a simple construction and excellent durability and which prevents the looseness of sliders in a secure fashion.

A fifth object of the present invention is to provide a vehicle sunroof that can reduce the thickness of the entirety of the sunroof device so as to reduce the height-wise dimension of the storing space to as low level as possible while keeping a good appearance inside the passenger compartment.

A sixth object of the present invention is to provide a vehicle sunroof device in which front and rear ends of a sliding lid can be lifted and/or lowered independently from each other, characterized in that the front and rear ends of the sliding lid are stably supported, especially, so as to prevent the sliding lid from staggering in lateral directions, and in that the width of guide rails can be decreased so as to form a wider opening in a roof of a vehicle.

According to the present invention, there is provided a vehicle sunroof device comprising: a tilting lid provided at a front part of an opening formed in a roof of a vehicle; a lifter mechanism for moving the tilting lid vertically at a rear end thereof; guide rails disposed on both side edge portions of the opening; a sliding lid provided at a rear part of the opening; and sliders for supporting the sliding lid, each of the sliders moving along the guide rails to move longitudinally through the sliding lid, wherein the lifter mechanism are provided so as to be oriented laterally at portions facing the rear end of the tilting lid on a laterally oriented cross member disposed so as to extend between front end portions of the guide rails.

Further, there is provided a vehicle sunroof comprising: a tilting lid provided at a front part of an opening formed in a roof of a vehicle; a lifter mechanism for moving the tilting lid vertically at a rear end thereof; guide rails disposed on both side edge portions of the opening; a sliding lid provided at a rear part of the opening; driving means for driving the lifter mechanism and the sliders; follower wires connected to the lifter mechanism and extending rearward along the guide rails; driving wires extending forward from the driving means along the both guide rails and connected to the sliders; and interlocking means being provided between rear end terminations of the follower wires and front end terminations of the driving wires.

Further, there is provided a vehicle sunroof device comprising: guide rails provided along both side edge portions of an opening formed in a roof of a vehicle; front and rear sliders slidably mounted on each of the guide rails so as to slide in longitudinal direction; a sliding lid for opening and closing the opening, the sliding lid being attached to the front slider at a front end thereof and to the rear slider at a rear end thereof; a front slider lifter mechanism via which the front end of the sliding lid is attached to the front slider; a rear slider lifter mechanism via which the rear end of the sliding lid is attached to the rear slider; first guiding means for lowering the rear slider lifter mechanism at an earlier stage of a rearward movement of the rear slider together with the sliding lid; and second guiding means for lowering the front slider lifter mechanism while the sliding lid is moving rearward, the first and second guiding means being provided on each of the guide rails.

Still further, there is provided a vehicle sunroof device comprising: a guide rail provided on an edge portion of an opening formed in a roof of a vehicle, the guide rail having a control groove oriented in a longitudinal direction, an upper piece provided along and above the control groove, and a switching path inclined upwardly toward a rear portion thereof for establishing a communication between the control groove and the upper piece; a sliding lid so as to be lowered from a fully closed position where the opening is closed and to be slid rearward thereby being stored under a lower side of the roof; a slider slidably fitted in the guide rail, the slider being connected to the sliding lid to support the sliding lid, the slider comprising: a sliding body slidably fitted in the guide rail; a link pivotably attached to the sliding lid at a first end thereof and pivotably attached to the sliding body at a second end thereof, the link moving between an erected position where the sliding lid is supported at the fully closed position and a flattened-out position where the sliding lid is lowered; a sliding member provided on the link so as to be brought into engagement with the control groove of the guide rail so as to hold the link at the erected position and to move via the switching path onto the upper piece so as to hold the link at the flattened-out position; and a first elastic body being provided between the sliding body and the link for biasing the sliding member toward an upper side of the control groove when the link is located at the erected position.

Still further, there is provided a vehicle sunroof device comprising: a guide rail provided on an edge portion of an opening formed in a roof of a vehicle, the guide rail having a control groove oriented in a longitudinal direction, an upper piece provided along and above the control groove, and a switching path inclined upwardly toward a rear portion thereof for establishing a communication between the control groove and the upper piece; a sliding lid so as to be lowered from a fully closed position where the opening is closed and to be slid rearward thereby being stored under a lower side of the roof; a slider slidably fitted in the guide rail, the slider being connected to the sliding lid to support the sliding lid, the slider comprising: a sliding body slidably fitted in the guide rail; a link pivotably attached to the sliding lid at a first end thereof and pivotably attached to the sliding body at a second end thereof, the link moving between an erected position where the sliding lid is supported at the fully closed position and a flattened-out position where the sliding lid is lowered; a sliding member provided on the link so as to be brought into engagement with the control groove of the guide rail so as to hold the link at the erected position and to move via the switching path onto the upper piece so as to hold the link at the flattened-out position; and a first elastic body provided between the sliding body and the link for biasing the sliding member toward the upper piece when the link is located at the flattened-out position.

Furthermore, there is provided a vehicle sunroof device comprising: a guide rail disposed along an edge portion of an opening formed in a roof of a vehicle and having a substantially U-shaped cross section, the guide rail having a first side wall facing the opening and a second side wall facing an outside of the vehicle; a slider slidably fitted in the guide rail and moving in a longitudinal direction; a sliding lid supported by the slider so as to move between a fully closed position where the sliding lid closes the opening and a fully opened position where the sliding lid is lowered and slid rearward and stored below the roof; and a drain slidably provided on the guide rail so as to extend therebetween, wherein the first side wall facing the opening is made higher than the second side wall facing the outside of the vehicle, and the drain is slidably attached to an upper end of the first side wall facing the opening.

Further, there is provided a vehicle sunroof device comprising: a guide rail disposed along an edge portion of an opening formed in a roof of a vehicle, having a substantially U-shaped cross sectional configuration and having a side wall on a first side facing the opening and a second side wall facing an outside of the vehicle, a pair of front and rear sliders slidably mounted on the guide rail, respectively, so as to slide in a longitudinal direction for supporting front and rear ends of a sliding lid for opening and closing the opening; links that can be erected and flattened out provided between the respective sliders and the sliding lid for vertically moving the end portions of the sliding lid, the sliders being moved in a longitudinal direction by driving means so as to move the sliding lid between a fully closed position where the sliding lid closes the opening and an opened position where the sliding lid is lowered from the fully closed position and is slid rearward to be stored below the roof; first guiding means for guiding a first sliding member protruding from a side of the link and vertically moving the front end of the sliding lid, the first guiding means being provided on one of opposed surfaces of the first side wall and the second side wall; and second guiding means for guiding a second sliding member protruding from a side of the link and vertically moving the rear end of the sliding lid, the second guiding means being provided on the other opposed surface.

Still further, there is provided a method for opening and closing a sliding lid for opening and closing an opening formed in a roof of a vehicle, comprising the steps of: lowering the sliding lid at a rear end thereof a predetermined distance from a fully closed position where the opening is closed; moving the sliding lid slightly rearward; lowering a front end of the sliding lid a predetermined distance after the front end is moved slightly rearward away from a front edge of the opening; moving rearward the sliding lid until the sliding lid reaches a fully opened position; and moving the sliding lid following the steps in a reverse fashion when closing the sliding lid.

Features and advantages of the invention will become understood from the following detailed description of the preferred embodiments described in conjunction with the attached drawings.

DETAILED DESCRIPTION OF THE PREFERRED EMBODIMENTS

Figure 1:
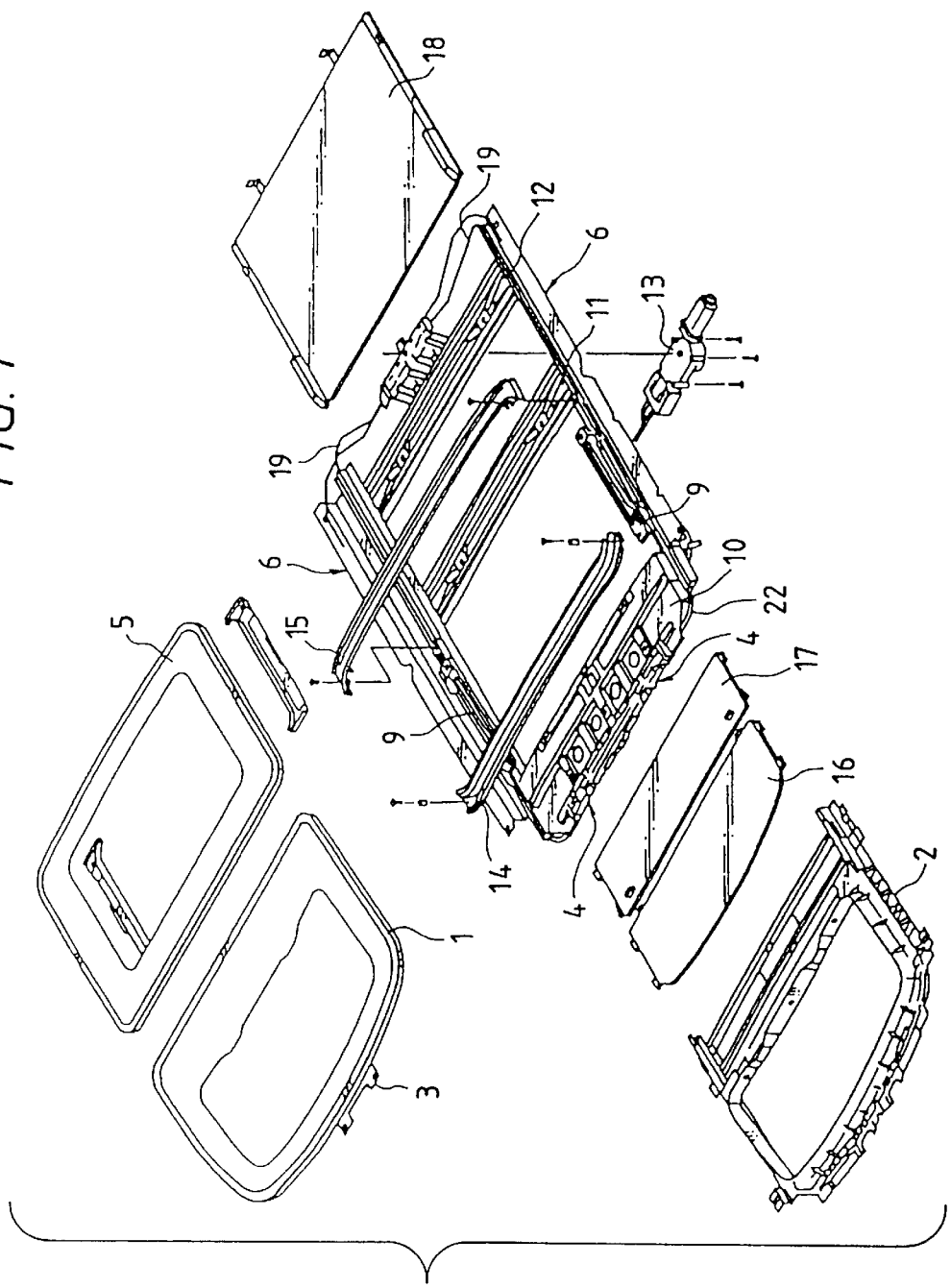
FIG. 1 shows an exploded perspective view of one embodiment of a vehicle sunroof device according to the present invention.
Figure 2:
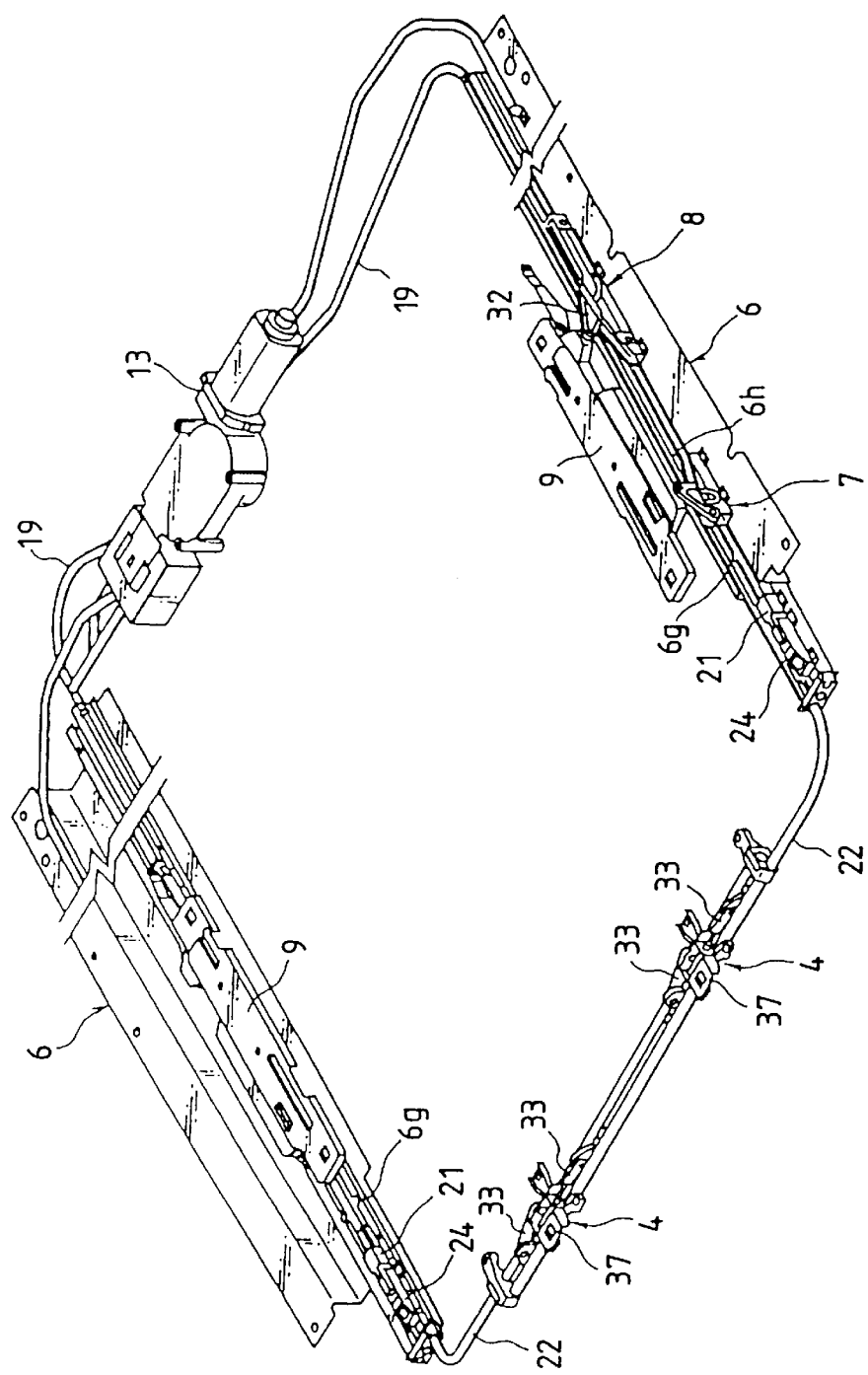
FIG. 2 shows a perspective view showing internal mechanisms of the embodiment of the vehicle sunroof device according to the present invention.

FIG. 1 is an exploded perspective view of the entirety of a vehicle sunroof device mounted on an opening formed in a roof of a vehicle, and FIG. 2 is a perspective view of an internal mechanism of the vehicle sunroof device.

In FIG. 1, reference numeral 1 denotes a tilting lid, and reference numeral 2 denotes a front frame fixed to a front part of the opening.

The tilting lid 1 is pivotably supported at a front end portion thereof on a roof inner panel at a front edge of the opening by means of a hinge 3 and connected to lifter mechanisms 4, which will be described later, at a rear end portion thereof, and the tilting lid is constructed so as to be moved vertically with these lifter mechanism 4. Reference numeral 5 denotes a sliding lid and this sliding lid is supported by front and rear sliders 7, 8 and supporting brackets 9 in such a manner as to move longitudinally of the vehicle, the front and rear sliders 7, 8 being adapted to move along a pair of left and right guide rails 6 disposed along both side edge portions of the opening in such a manner as to be oriented longitudinally.

Figure 3:
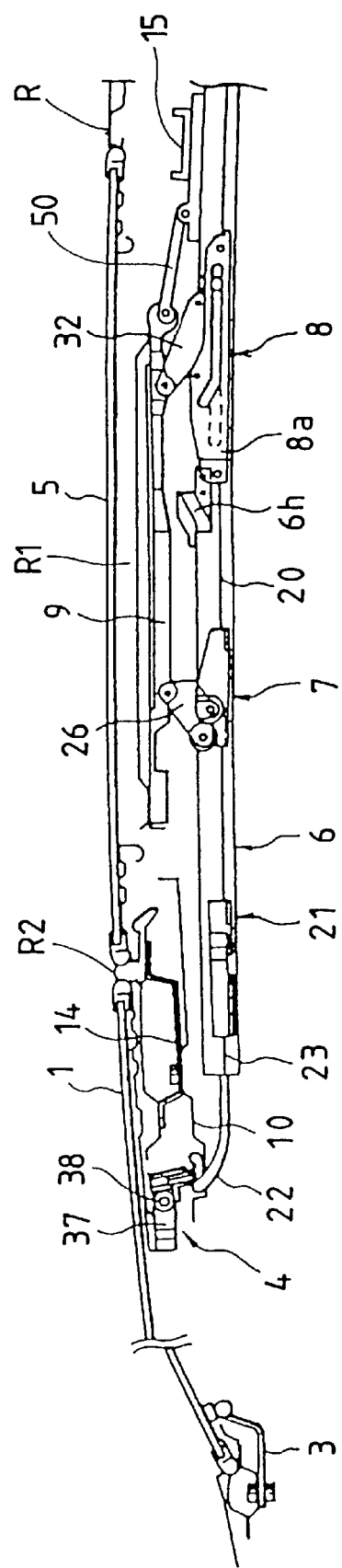
FIG. 3 shows a side schematic view of a roof according to the same embodiment when a tilting lid and a sliding lid are in a fully closed state.
Figure 4:
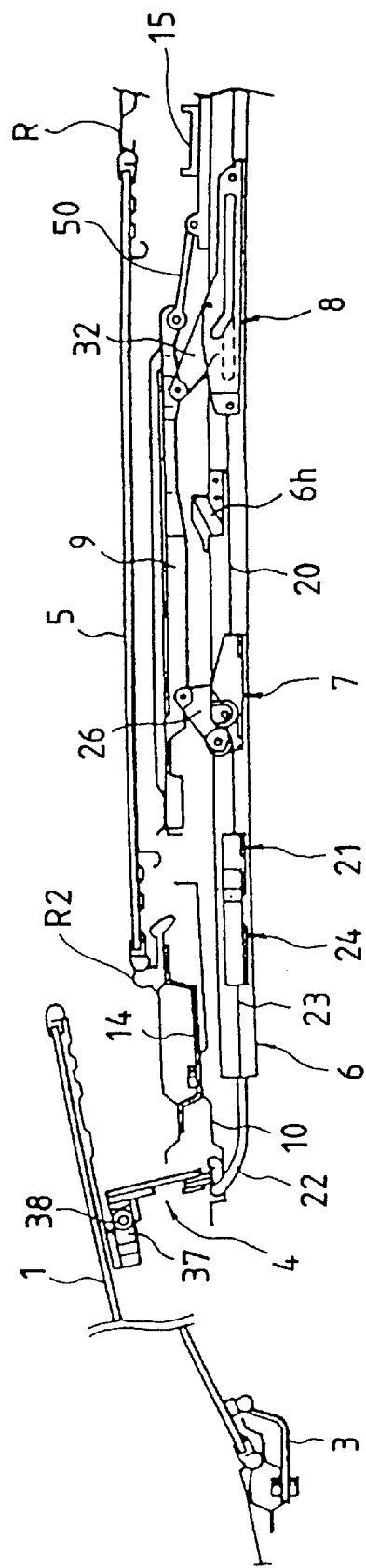
FIG. 4 shows a side schematic view of the roof according to the same embodiment with the tilting lid being in a tilt-up state, while the sliding lid being in the fully closed state.

The sliding lid 5 can be moved between a fully closed position shown in FIGS. 3 and 4 and a fully opened position in which it is stored between the roof (R) and a ceiling. When located at the fully closed position, the sliding lid 5 is in press contact with seal members (R2) provided around edges of the opening (R1) for sealing the opening.

The left and right guide rails 6 are connected to each other by laterally oriented front, center and rear cross members 10, 11, 12, and the lifter mechanisms 4 are disposed on the front cross member 10 at portions confronting a rear end edge of the tilting lid 1. A driving means 13 having a motor with a decelerator is provided on the rear cross member 12.

Reference numeral 14 denotes a drain fixed to the front cross member 10 for the tilting lid, reference numeral 15 a drain connected to the rear slider 8 for the sliding lid, reference numerals 16, 17 front and rear shades for the tilting lid, respectively, that are divided in a longitudinal direction and mounted on the front frame 2 in such a manner as to slide longitudinally, and reference numeral 18 a shade for the sliding lid mounted on the guide rails 6 in such a manner as to slide longitudinally.

The drain 15 is formed curvedly along the roof R of the vehicle in such a manner that it becomes the highest at a central portion thereof, and is connected to a rear end of the supporting bracket 9 via a connecting member 50 so that it slides along the guide rail 6 together with the sliding lid 5. A moving shoe 12a is fixed under a lower side of each drain 15 that is slidably fitted in the upper piece 6f of the guide rail 6.

Figure 18:
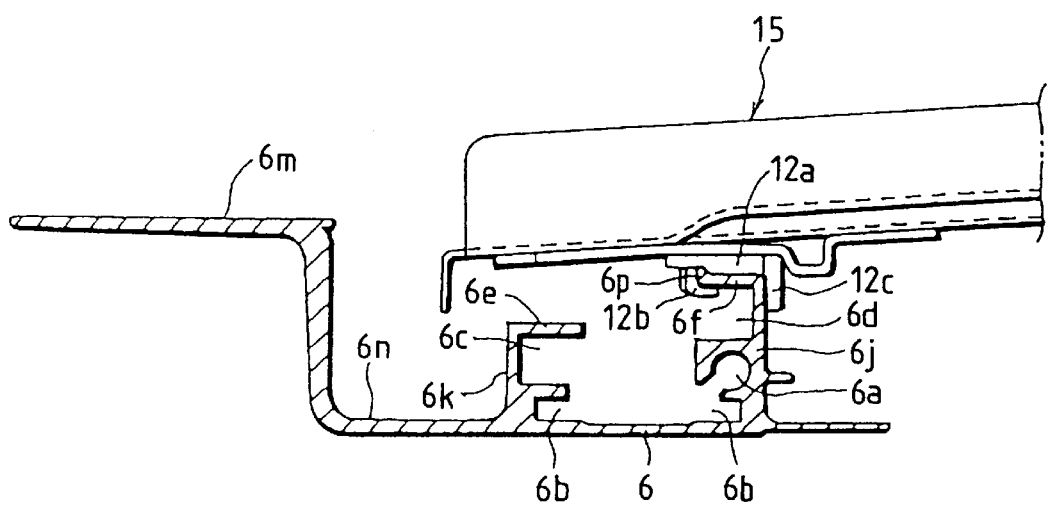
FIG. 18 shows a cross sectional view of a guide rail adjacent to a drain.
Figure 19:
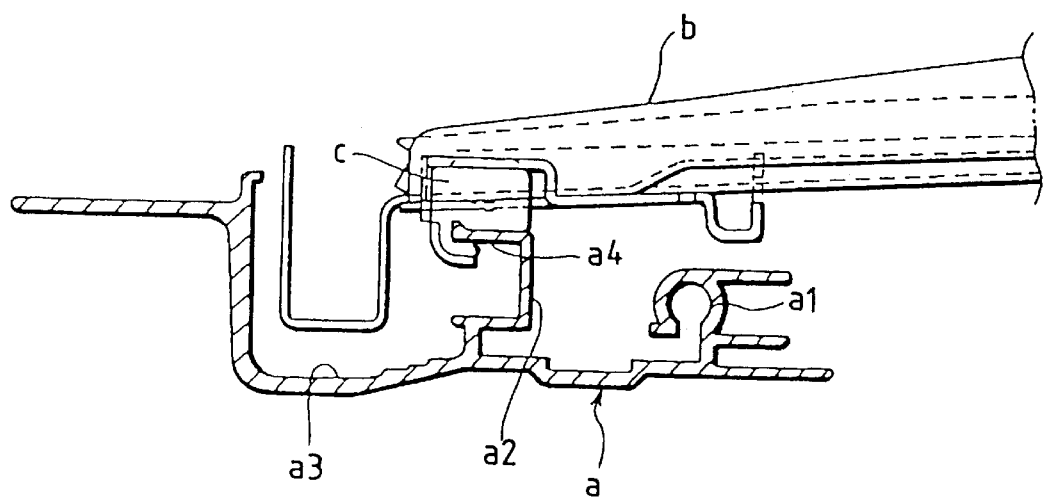
FIG. 19 shows an enlarged view of a part of the conventional vehicle sunroof device.

As shown in FIG. 18, the moving shoe 12a has a hook-like holding portion 12b for holding therein the upper piece 6f to restrain the looseness of the drain 12 in vertical directions and a suspending portion 12c adapted to be brought into abutment with a side of the side wall 6j facing the opening R1 for holding the upper piece 6f in lateral directions of the vehicle together with the holding portion 12b so as to restrain the looseness of the drain 12 in the lateral directions.

Figure 14:
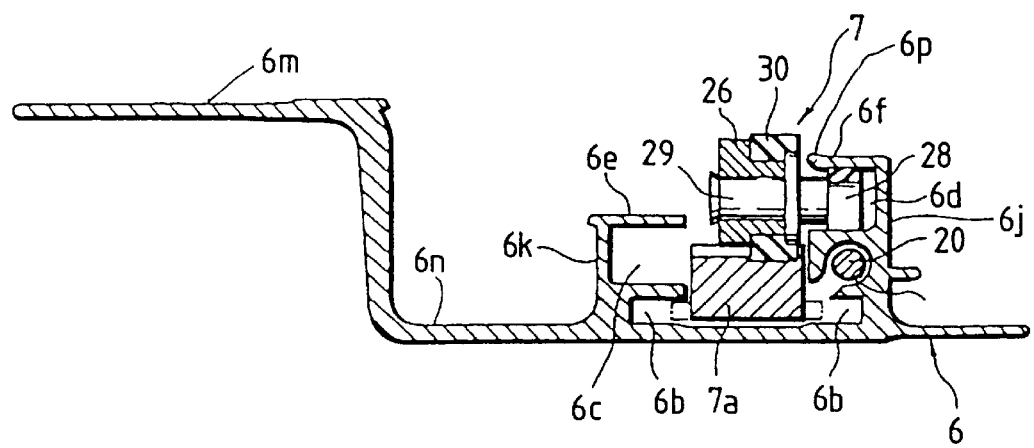
FIG. 14 shows an enlarged cross sectional view taken along line B—B of FIG. 13.
Figure 16:
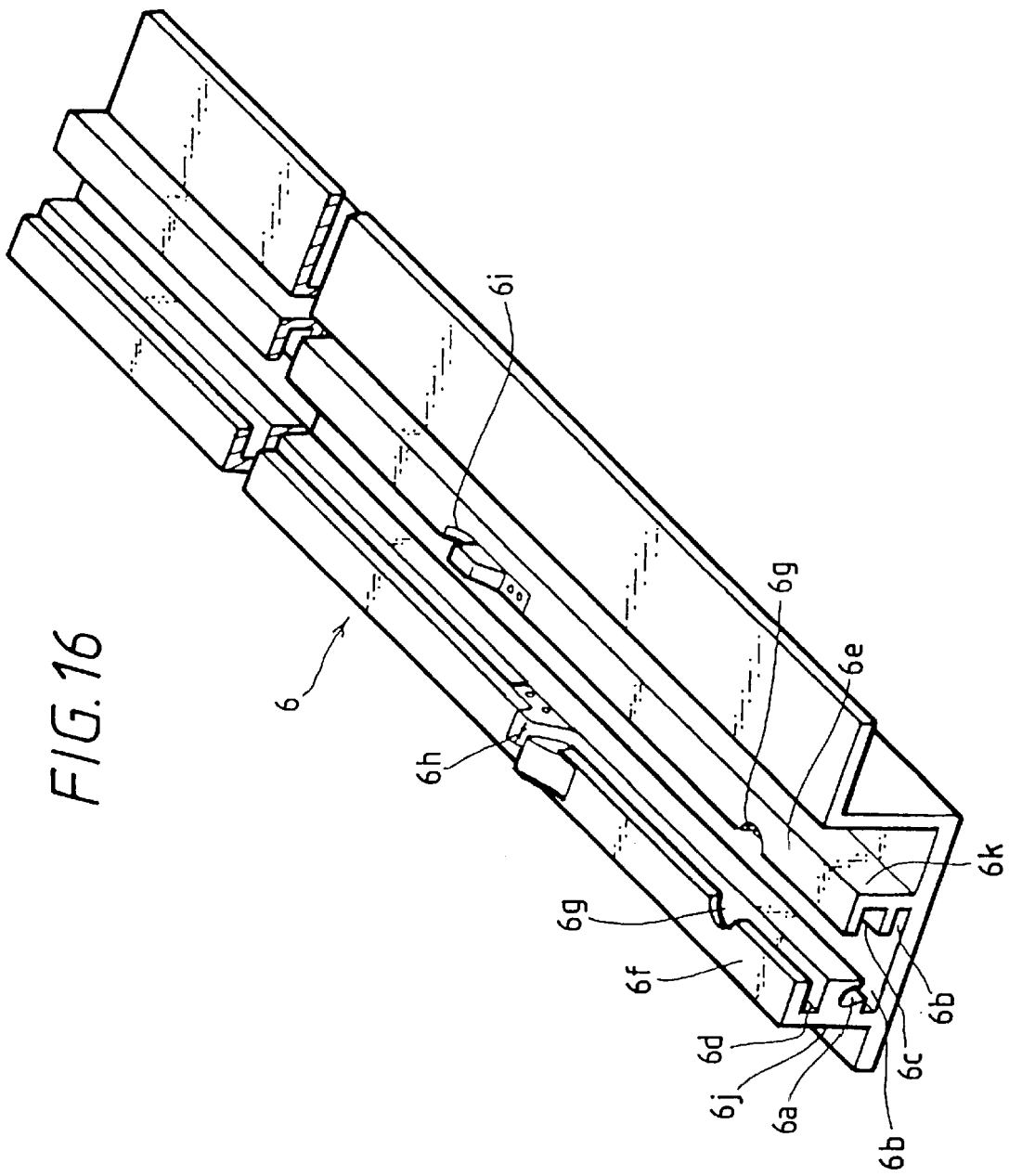
FIG. 16 shows a perspective view of one of guide rails.

The guide rails 6 have a cross-sectional configuration such as shown in FIGS. 14 and 16.

Namely, the guide rail 6 is constituted by a side wall 6j on a side facing the roof opening and a side wall 6k opposed to the side wall 6j and disposed on a side facing the outside of the vehicle, and formed in lower portions of the both side walls 6j, 6k are square guide grooves 6b, 6b which are made open toward each other. The cross sectional configuration of the guide rail is substantially U-shaped. A circular wire groove 6a is formed in a side of the side wall 6j closer to the opening which faces the outside of the vehicle at a vertically intermediate portion above the guide groove 6b, so that a driving wire 20, which will be described later, can be put therethrough. On the other hand, a square groove 6c having a square cross-sectional shape is formed on the side wall 6k facing the outside of the vehicle above the guide groove 6b by an upper piece 6e forming an upper side of the side wall 6k in such a manner as to be made open inwardly, and a square control groove 6d is formed on the side wall 6j above the wire groove 6a by an upper piece 6f forming an upper side of the side wall 6j. The upper pieces 6e, 6f extend toward each other and the upper piece 6e on the side facing the outside of the vehicle is lowered than the upper piece 6f on the side closer to the opening. An elongated projection 6p having a circular cross section is formed at a distal end of the upper piece 6f. In addition, as shown in FIG. 16, a pair of left and right engagement grooves 6g (refer to FIGS. 2, 8 and 9) are formed so as to be opposed to each other in the both upper pieces 6e, 6f at positions along the guide rails 6 slightly closer to front ends thereof. Furthermore, similarly, a switching path 6h (refer to FIGS. 2 to 5, and FIGS. 13 and 15) is formed on the side wall 6j closer to the opening at an intermediate position along the side wall 6j for establishing a communication between a bottom wall of the control groove 6d and the upper piece 6f, and a stopper groove 6i extending continuously with the upper piece 6e and inclining forwardly downwardly (refer to FIG. 13) is formed on the side wall 6k on the side facing the outside of the vehicle at a position more rearward of the switching groove, the switching path 6h and the stopper groove 6i being formed, respectively, by separate members secured to the respective guide rails. However, they may be directly formed on the guide rails 6 without using separate members.

A mounting portion 6m for the roof R and a rain water draining gutter groove 6n are formed on an edge of the guide rail on the side facing the outside of the vehicle integrally therewith.

The height of the sidewall 6j is made taller than at least the front and rear sliding bodies 7a, 8a of the front and rear sliders 7, 8, so as to protrude upwardly higher than them, and thus the same side wall is given a sufficient height such that the respective grooves in the guide rail 6 are not exposed to the opening R1 side.

Among the constructions described above, a cam surface as a guide means for guiding the roller 28 (sliding member) of the link 26 constituting the lifter mechanism for the front slider 7, which will be described later, is formed by the bottom side of the control groove 6d, the bottom side of the switching path 6h and the upper side of the upper piece 6f formed on the side wall 6j on the side facing the opening, and a cam surface as a guide means for guiding the pin 32a (sliding member) of the link 32 constituting the lifter mechanism for the rear slider 8 is formed by the stopper groove 6i provided on the side wall 6k on the side facing the outside of the vehicle and the upper side of the upper piece 6e.

The driving means 13 and the respective guide rails 6 are connected to each other by left and right pipes 19, and left and right driving wires 20 are put through the pipes 19 that can be flexed, pushed and pulled. The driving wires 20 are put through the wire grooves 6a of the respective guide rails 6 via the respective pipes 19 and fixedly attached to the rear sliders 8 and can be moved longitudinally of the vehicle with the driving motor, driving interlocking members 21 slidably fitted in the guide rails 6 being fixedly attached to front-most end terminations of the respective driving wires 20.

Figure 7:
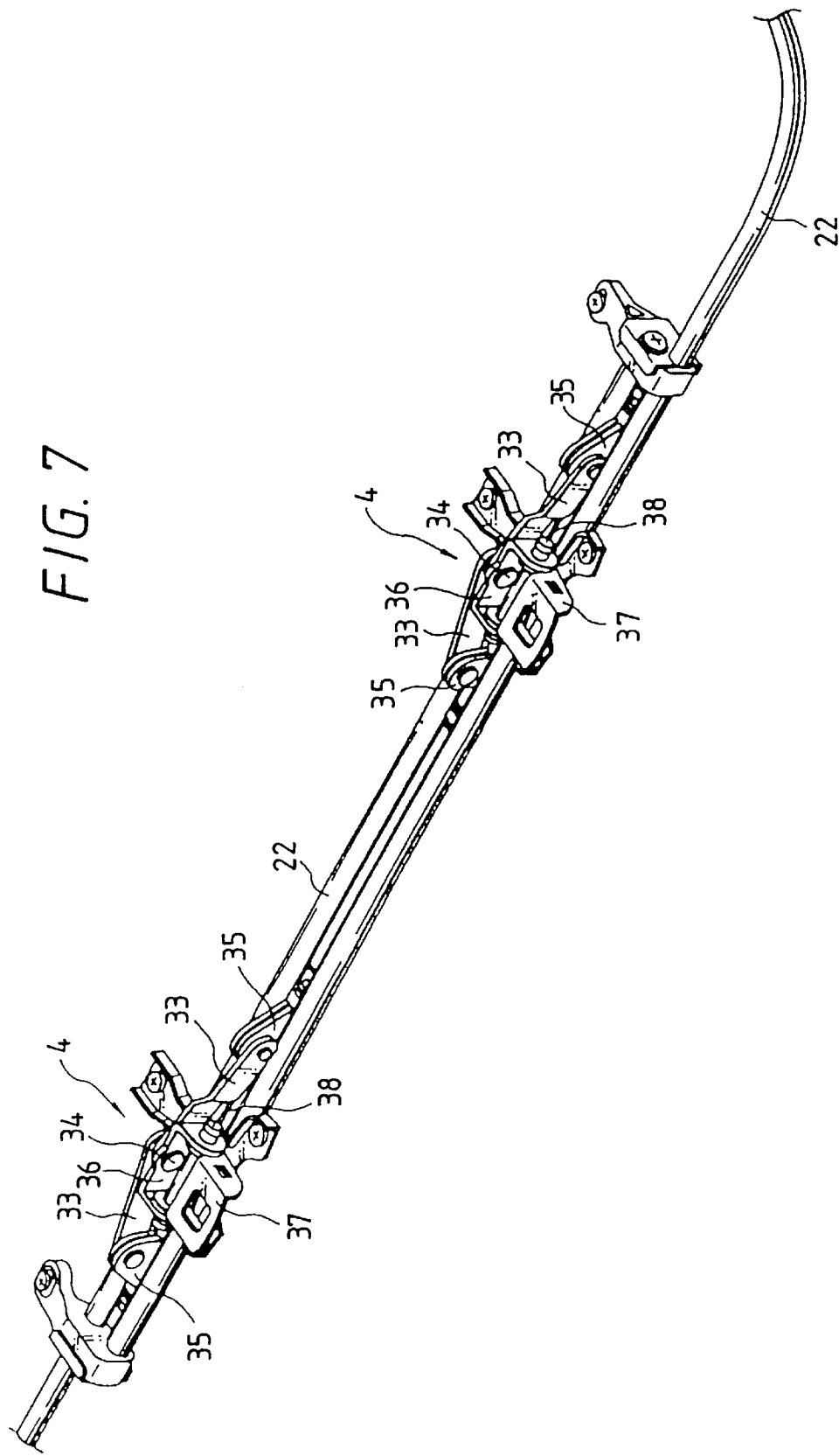
FIG. 7 shows an enlarged perspective view of lifter mechanisms according to the same embodiment.

As shown in FIGS. 2 and 7, left and right pipes 22 are connected to front ends of the respective guide rails 6. Front portions of these left and right pipes 22 are bent inwardly substantially at right angles, and extend laterally over the front cross member 10 in such a manner as to overlap each other in a longitudinal direction. Follower wires 23 are put through the left and right pipes 22 which can be flexed, pushed and pulled. These follower wires 23 are put through the wire grooves 6a of the respective guide rails 6 and fixedly attached to rear end terminations of the respective follower wires are follower interlocking members 24 constructed to be brought into engagement with and disengagement from the driving interlocking members 21, respectively. The driving interlocking members 21 and follower interlocking members 24 constitute an interlocking mechanism for interlocking a series of opening and closing movements between the tilting lid 1 and the sliding lid 5.

Figure 17:
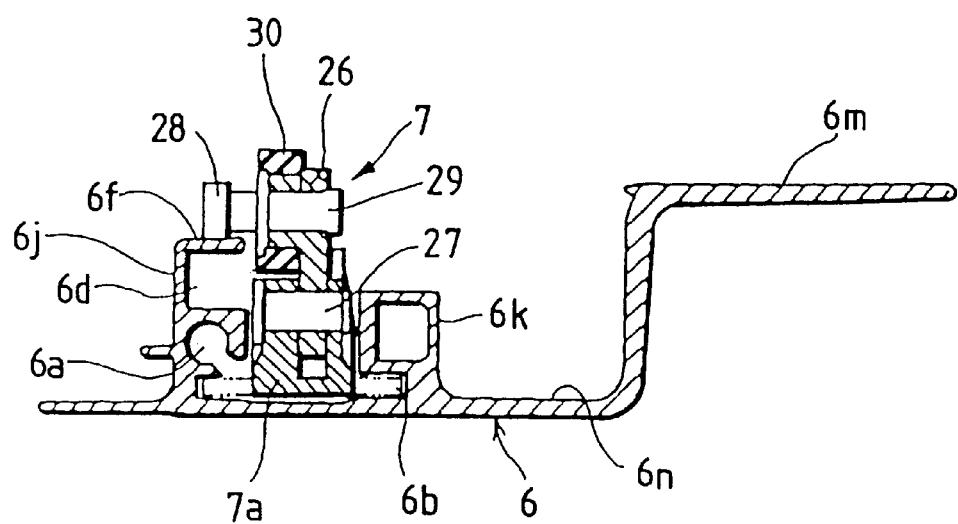
FIG. 17 shows a cross sectional view taken along line C—C of FIG. 15.

As shown in FIGS. 13 to 15 and 17, the front slider 7 has a sliding body 7a slidably fitted in the guide groove 6b of the guide rail 6. A lower end of a link 26 which is connected to the supporting bracket 9 via a shaft 25 is connected to the slider via a shaft 27 at an upper end thereof. The link 26 can move between an erected position shown in FIG. 13 and a flattened-out position shown in FIG. 15. As shown in FIG. 17, a stepped shaft 29 is provided on the link 26 in such a manner as to protrude from a side at a front portion thereof toward the control groove 6d, and provided on this shaft 29 is a roller 28 of a synthetic resin adapted to move in the control groove 6d and the upper piece 6f of the guide rail 6. An elastic body 30 is secured around the shaft 29 of the link 26 that is adapted to be brought into abutment with the sliding body 7a when the link 26 is erected, and also an elastic body 31 is secured to the sliding body 7a that is adapted to be brought into abutment with a lower side 26a of the link 26 when the link 26 is flattened out.

The sliding body 7a of the front slider 7 is shielded on a side thereof facing the opening R1 by the side wall 6j of the guide rail 6, whereby it is in no case exposed to the opening R1 side.

The roller 28 moves in the control groove 6d from when the sliding lid 5 is located at a fully closed position to when the roller 28 reaches the switching path 6h to thereby hold the link 26 at an erected position, and when the sliding lid 5 is moved further rearward, the roller 28 moves onto the upper piece 6f via the switching path 6h and shifts the link 26 to a flattened-out position to thereby hold the front end of the sliding lid 5 at a lowered position.

When the roller 28 is fitted in the control groove 6d of the guide rail 6, the roller 28 is pressed against a lower side of the upper piece 6f within the control groove 6d by virtue of the biasing force of the elastic body 30 produced when the elastic body 30 presses against the sliding body 7a, whereby looseness of the roller 28 and the link 26 is restrained. In addition, when the roller 28 is located on the upper piece 6f, an abutment portion 26a (lower side) of the link 26 presses against the elastic body 31 on the sliding body 7a and the roller 28 is pressed against the upper piece 6f by virtue of the biasing force of the elastic body 31, whereby looseness of the roller 28 and the link 26 is restrained.

Figure 13:
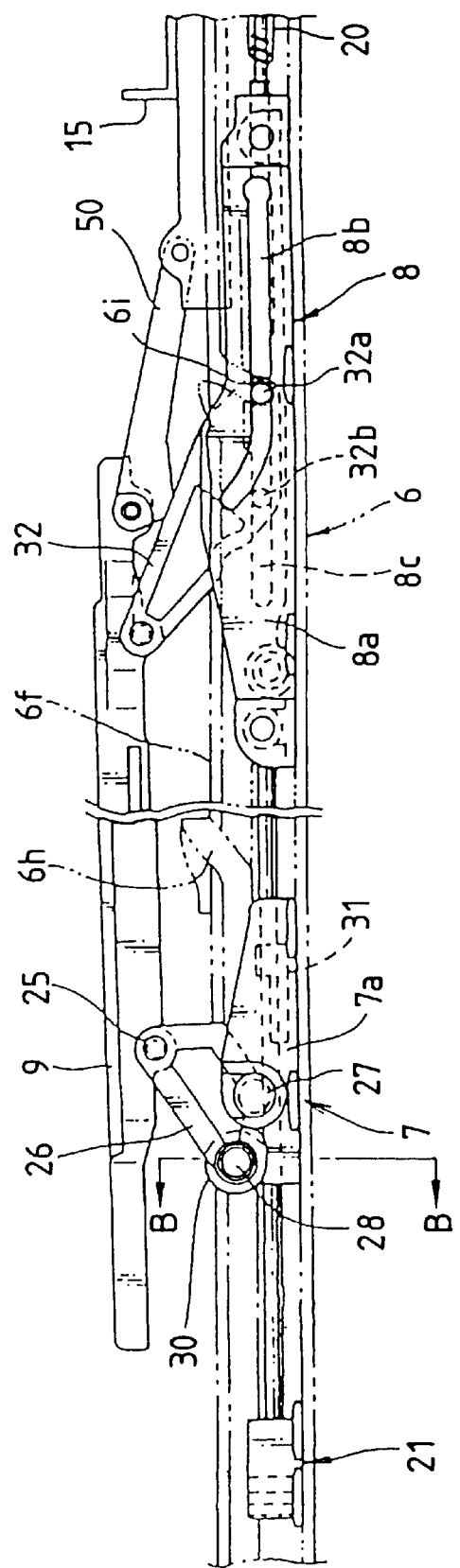
FIG. 13 shows a side view of a rear slider when the sliding lid is in the fully closed state.

As shown in FIG. 13, the rear slider 8 has a sliding body 8a fixedly attached to the driving wire 20 and slidably fitted in the guide rail 6. Formed in side walls of the sliding body 8a are a guide groove 8b having at a front end thereof an inclined portion oriented forwardly upwardly and a straight guide groove 8c.

A pin 32a is slidably fitted in the guide groove 8b. A pin 32a is planted at a rear end of a link 32 and adapted to be brought into engagement with and disengagement from the stopper groove 6i of the guide rail 6. A pin 32b planted in an intermediate portion of the link 32 is slidably and rotatably fitted in the guide groove 8c. The link 32 is pivotably supported on the supporting bracket 9 at an upper end thereof.

Figure 5:
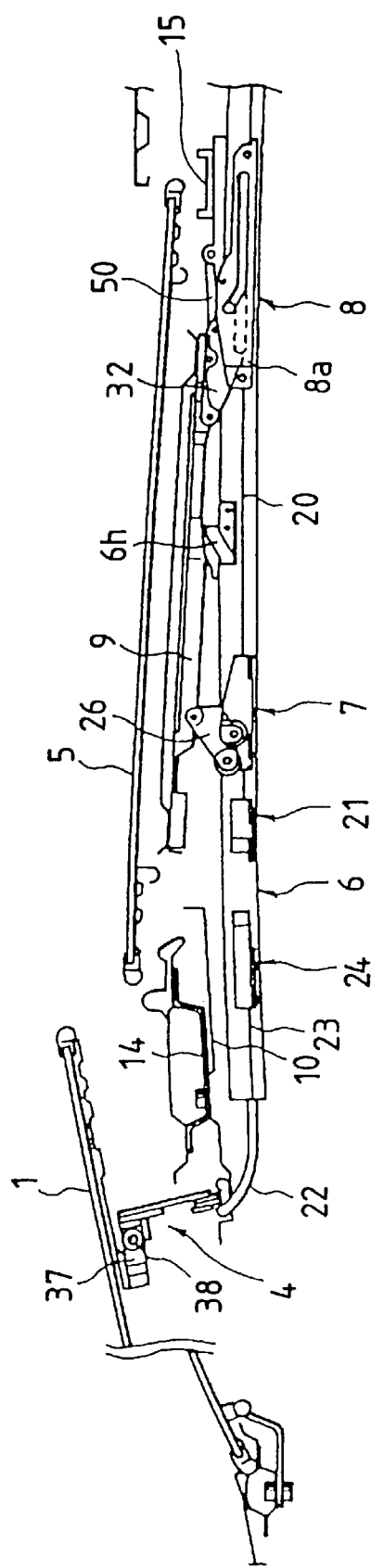
FIG. 5 shows a side schematic view of the roof according to the same embodiment with the tilting lid being in the tilt-up state, while the sliding lid being in a tilt-down state.

The link 32 is controlled to move between the erected position shown in FIGS. 3 and 13 and the flattened-out position shown in FIG. 5 depending on the relationship between the pins 32a, 32b and the guide grooves 8b, 8c with respect to engagement positions thereof.

The sliding body 8a of the rear slider 8 is shielded on the side facing the opening R1 by the side wall 6j of the guide rail 6, and therefore it is in no case exposed to the opening R1 side.

The construction of the rear slider 8 is basically identical to the technology disclosed in Japanese Patent Publication No. Hei. 6-462, and therefore a detailed description thereof will be omitted.

As shown in FIG. 7, a pair of left and right slider mechanisms 4 are provided, and each slider mechanism 4 is provided with a pair of left and right links 33. The pair of links 33 are rotatably connected to each other at upper ends thereof via shaft 34 oriented longitudinally, and rotatably connected at lower ends thereof to left and right sliders 35 fixedly attached to the follower cables 23 put through the different pipes 22. A bracket 36 is pivotably supported on the shaft 34, and a supporting bracket 37 is vertically tiltably attached to the bracket 36 via a horizontal shaft 38 oriented laterally. The rear end of the tilting lid 1 is fixedly attached to the supporting bracket 37.

Figure 8:
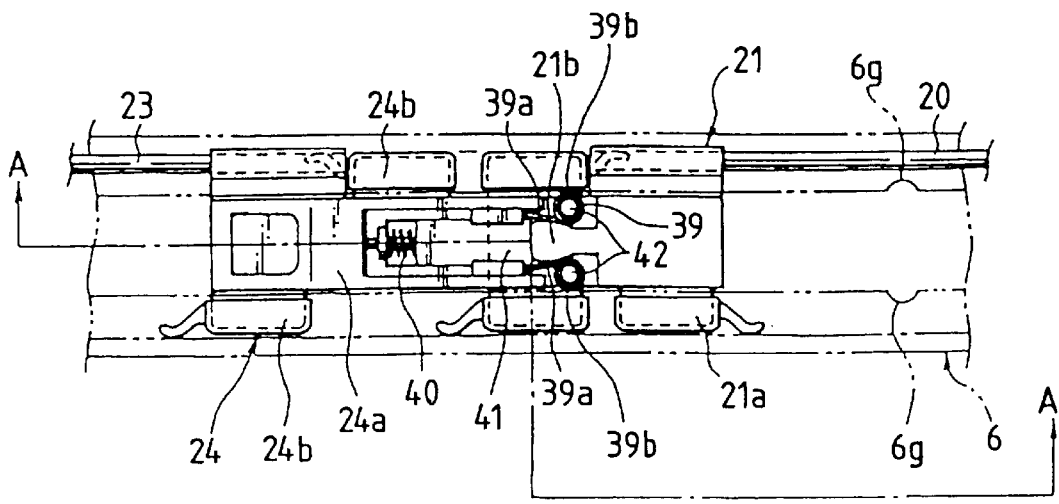
FIG. 8 shows an enlarged plan view of an interlocking mechanism of the same embodiment which is in an interlocked state.
Figure 9:
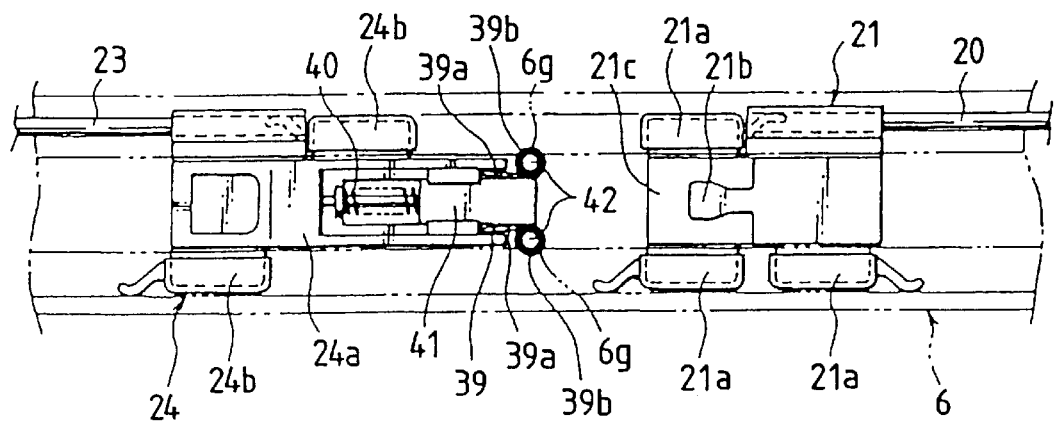
FIG. 9 shows an enlarged plan view of the interlocking mechanism of the same embodiment which is in a disengaged state.
Figure 10:
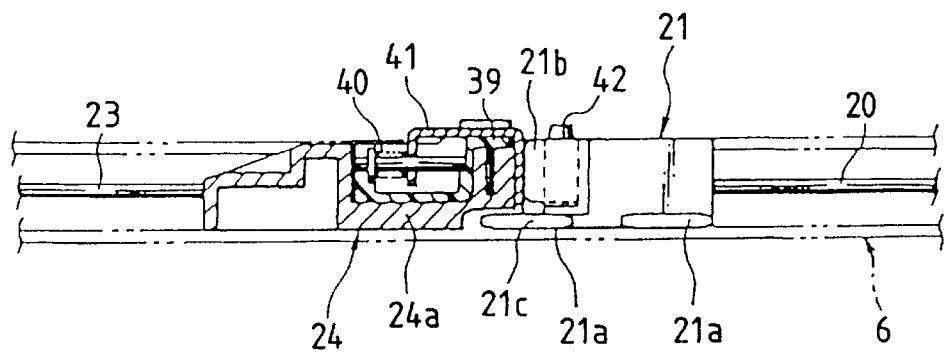
FIG. 10 shows a longitudinal sectional view taken along line A—A of FIG. 8.
Figure 11:
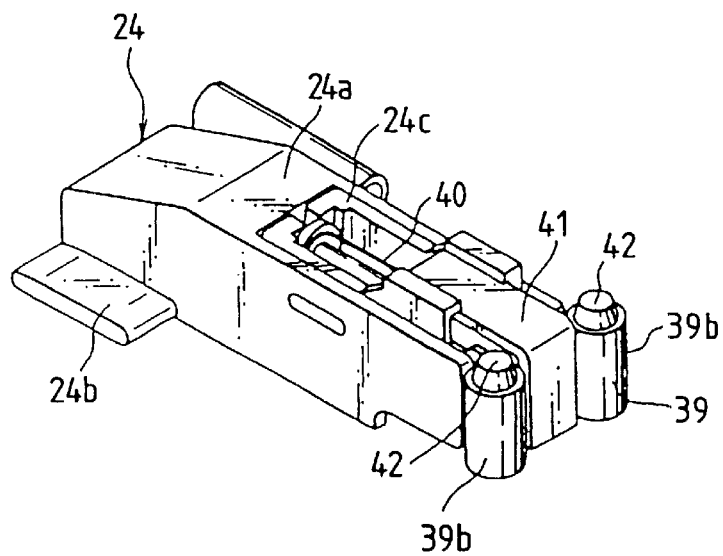
FIG. 11 shows a perspective view of a follower interlocking member.
Figure 12:
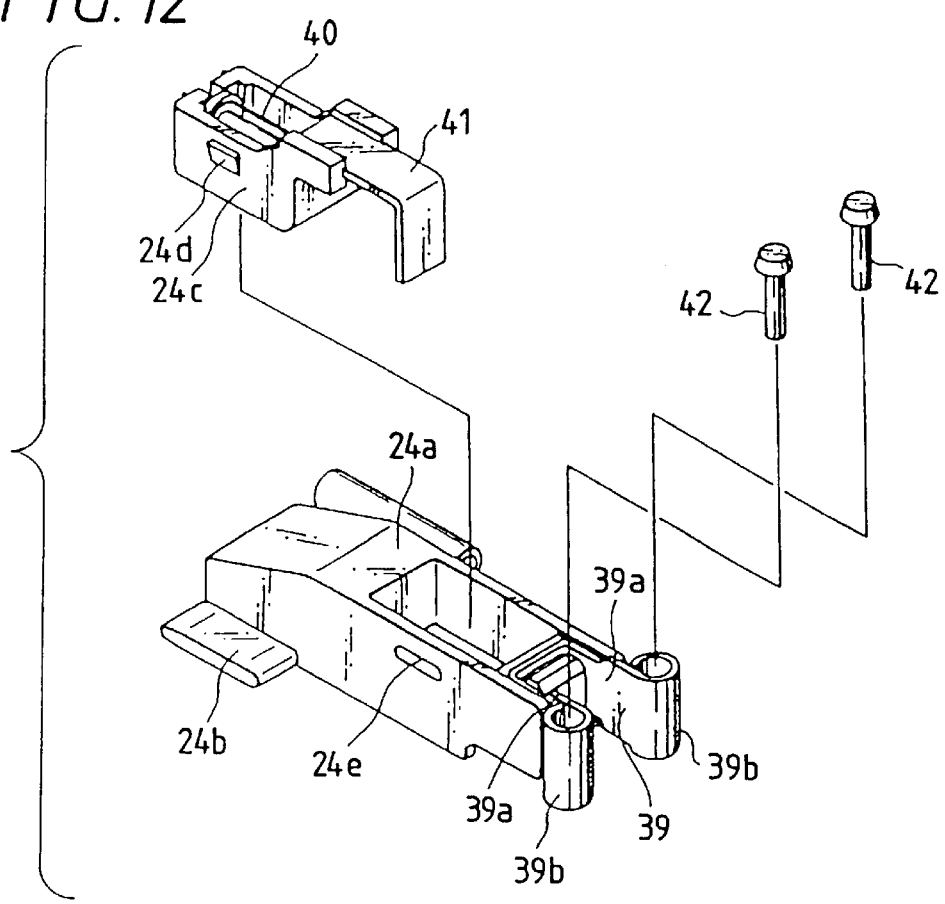
FIG. 12 shows an exploded perspective view of the follower interlocking member.

As shown in FIGS. 8 to 10, the driving interlocking member 21 has sliding portions 21a protruding laterally from each side thereof so as to slidably fit in the guide grooves 6b of the guide rail 6, a projection 21b expanded laterally at a front end thereof and formed so as to face the follower interlocking member 24, and a tongue-like piece 21c formed so as to connect the sliding portions 21a on the both sides thereof below the projection 21b and adapted to dive under part of a bottom side of the follower interlocking member 24.

As shown in FIGS. 8 to 12, the follower interlocking member 24 has a rigid diecast sliding body 24a molded from a die casting material and sliding portions 24b adapted to be brought into a slidable engagement with the guide grooves 6b of the guide rail 6. A pair of left and right leaf springs 39 are fixed to the sliding body 24b which each have an arm portion 39a having an elastic force and an engagement portion 39b rounded into a curl-like shape. Longitudinally slidably supported between the left and right arm portions 39a is a reversely U-shaped restraint plate 41 that is biassed by a spring 40 rearward toward the driving interlocking member 21.

The restraint plate 41 and the spring 40, which are installed in a case 24c molded from a synthetic resin material and then, are incorporated in the sliding body 24a. The case 24c is inserted into the sliding body 24a from above, and is fixed thereto by bringing pawls 24d on the case 24c into engagement with holes 24e in the sliding body 24a. A pin 42 is fittingly inserted into the engagement portion 39c so as to enhance the strength thereof.

FIG. 3 shows a state in which the tilting lid 1 and the sliding lid 5 are fully closed. In this state, as shown in FIG. 8, the driving interlocking member 21 is coupled with the follower interlocking member 24 with the projection 21b being held between the arm portions 39a. At this moment, the engagement portions 39b of the follower interlocking member 24 are in abutment with inner edges of the upper pieces 6e, 6f of the guide rails 6, narrowing a gap between the respective arms 39a, and therefore the projection 21b cannot escape from between the arm portions 39a.

Incidentally, when the sliding lid 5 is located at the fully closed position, with the roller 28 being fitted in the control groove 6d of the guide rail 6, the link 26 of the front slider 7 is held at the erected position, and the sliding body 7a and the roller 28 are shielded by the side wall 6j and there is no risk of the sliding body and the sliding member being exposed to the opening R1 side. Further, with the pin 32a being fitted in the stopper groove 6i, the rear slider 8 is held at the erected position, and the sliding body 8a is shielded by the side wall 6j and there is no risk of the sliding member being exposed to the opening R1 side. The drain 15 is located under the rear end of the sliding lid 5.

When the driving wires 20 are pulled by the driving means 13, the follower wires 23 are also pulled together via the interlocking means that is then in an interlocked state, and the links 33 of the lifting mechanisms 4 are displaced from an expanded state to a contracted state, whereby the tilting-lid 1 is put in a tilt-up state as shown in FIG. 4 in which the tilting lid is lifted at the rear end thereof. At this moment, the interlocking means moves in the guide rails rearward. Then, as shown in FIG. 9, when the engagement portions 39a of the follower interlocking member 24 are brought into engagement with the engagement grooves 6g in the upper pieces 6e, 6f of the guide rail 6, respectively, the follower interlocking member 24 stops at that position, and the gap between the arm portions 39a are expanded, whereby the projection 21b is released from between the arm portions 39a, this allowing the driving interlocking member 21 to move further rearward alone.

Incidentally, when the sliding lid 5 is located at the position shown in FIG. 4, the link 26 of the front slider 7 is located at the erected position shown in FIG. 13 with the roller 28 being fitted in the control groove 6d of the guide rail 6. At this moment, the elastic body 30 is in abutment with the sliding body 7a, and the roller 28 is pressed against the upper side of the control groove 6d by virtue of the biasing force of the elastic body 30, whereby looseness of the sliding body 7a and the link 26 is suppressed.

The restraint plate 41 intrudes into between the arm portions 39a by virtue of the biasing force of the spring 40 so as to restrain the arm portions 39a from being inwardly deformed and maintain the engagement between the engagement portions 39b and the engagement grooves 6g to thereby hold the tilting lid at a tilt-up state. In addition, since the engagement portions 39b are reinforced by the pins 42, this strengthening the engagement with the engagement grooves 6g, thereby making it possible to securely hold the tilting lid 1 in the tilt-up state.

When the tilting lid 1 is shifted from the fully closed state to the tilt-up state, the sliding lid 5 remains held at a fully closed state. In other words, even when the rear sliders 8 are moved backward together with the driving wires 20, the pins 32a, 32b of the respective links 32 only idle in the straight guide grooves 8b, 8c, and the links 32 remain held at their erected positions.

Figure 6:
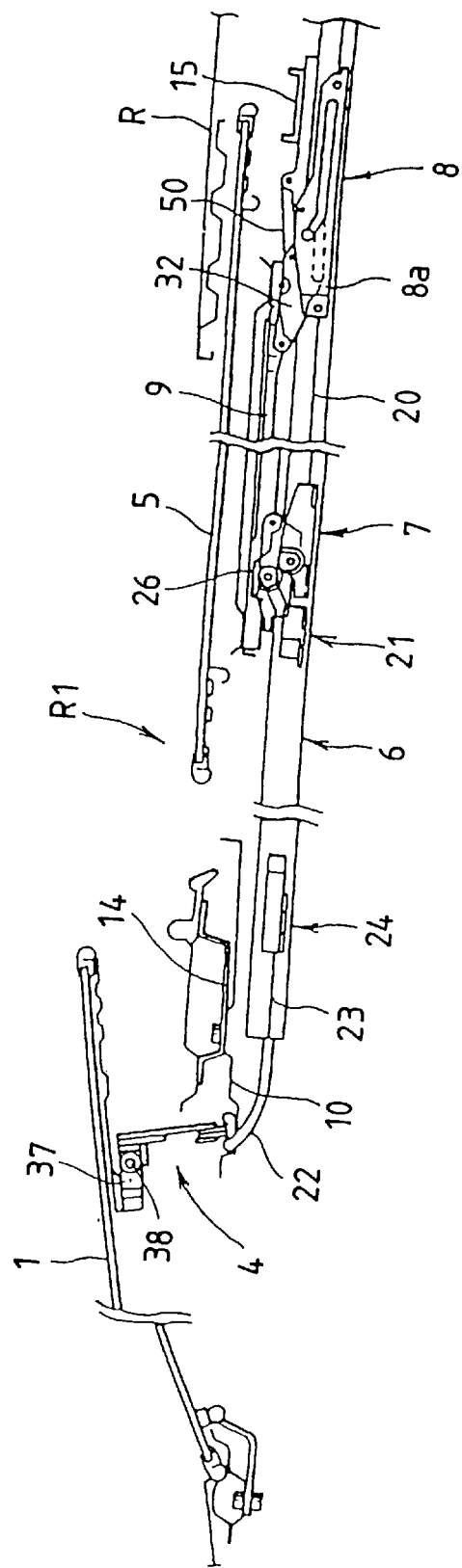
FIG. 6 shows a side schematic view of the roof according to the same embodiment with the tilting lid being in the tilt-up state, while the sliding lid being in a sliding state.

When the driving wires 20 are further pulled from where the tilting lid 1 is in the tilt-up state by the driving means 13, the rear sliders 8 being moved further rearward, the horizontal groove 8c is moved rearward relative to the pin 32b, but there is caused no movement of the pin 32b. In addition, when the guide groove 8b is moved rearward relative to the pin 32a, the pin 32 is lifted upwardly by the inclined portion at the front portion of the guide groove 8b and escapes from the stopper groove 6i, moving onto the upper side of the upper piece 6e of the guide rail 6. This allows the link 32 to rotate in such a manner as to fall down forwardly from the erected position to the flattened-out position, and, as shown in FIG. 5, the sliding lid 5 is put in a tilt-down state in which the rear end thereof is lowered. Thereafter, when the pin 32b is brought into engagement with the front end of the guide groove 8c and the sliding lid 5 is moved backward together with the rear sliders 8 and the driving wires 20 over a predetermined distance. After the front end of the sliding lid 5 is moved away from the seal member R2, the roller 28 of the front slider 7 moves from the control groove 6d of the guide rail 6 onto the upper side 6f thereof via the switching path 6h. This allows the link 26 to be moved from the erected position to the flattened-out position so as to lower the front end of the sliding lid 5, thus, as shown in FIG. 6, the sliding lid 5 being put in a state in which it is lowered at the front and rear ends thereof. Thereafter, the sliding lid 5 is further pulled to slide backward to a fully opened state while remaining in the lowered state.

When the sliding lid 5 is moved rearward together with the front and rear sliders 7, 8, since the roller 28 of the front slider 7 moves while being pressed against the upper side of the control groove 6d by virtue of the biasing force of the elastic body 30, looseness of the sliding body 7a and the link 26 is suppressed, thereby making it possible to obtain a smooth sliding movement of the sliding lid 5.

Figure 15:
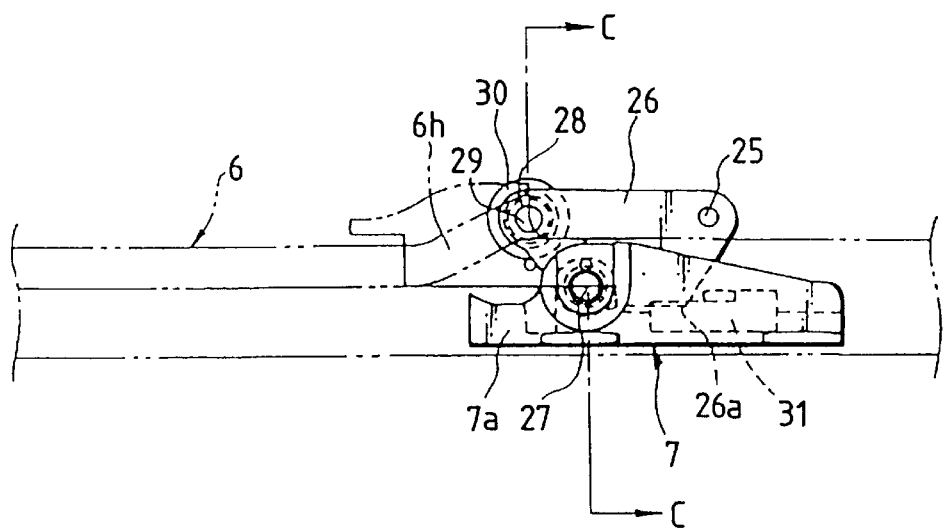
FIG. 15 shows an enlarged side view of a front slider when the link is a flattened-out state.

As shown in FIG. 15, in a state in which the sliding lid 5 is lowered at the rear end thereof, the abutment portion 26a of the link 26 is in abutment with the elastic body 31, and since the roller 28 moves while being pressed against the upper side of the upper piece 6f by virtue of the biasing force of the elastic body 31, looseness of the sliding body 7a and the link 26 is restrained, thereby making it possible to obtain a smooth sliding movement of the sliding lid 5.

A closing operation of the sliding lid 5 and the tilting lid 1 is performed in a reverse mode to the opening operation described above by pushing the driving wires 20 with the driving means 13. In other words, when the sliding lid 5 is moved forward from the fully opened position and the pin 28 is moved from the upper side of the upper piece 6f into the control groove 6d via the switching path h at a predetermined position, the link 26 is displaced to the erected position, and the front end of the sliding lid 5 is raised. Moreover, when the sliding lid 5 is moved forward and the pin 32a is lowered by the inclined portion of the guide groove 8b so as to be lowered into the stopper groove 6i, the link 32 is rotated upwardly and the rear end of the sliding lid 5 is raised, thereby reproducing the fully closed state. With the sliding lid 5 being put in the fully closed sate, when the driving wires 20 are pushed forward further, the projection 21b of the driving interlocking member 21 is brought into abutment with the restraint plate 41 of the follower interlocking member 24 to thereby push it in forward against the biasing force of the spring 40, whereby the restraint plate 40 cancels the inward deformation of the arm portions 39a, thereby making it possible to disengage the engagement portions 39b from the engagement grooves. Then, the projection 21b protrudes into between the arm portions 39a and the tongue-like portion 21c dives under the bottom side of the restraint plate 41 of the follower interlocking member 24. When the follower wires 23 are pushed forward via the interlocking means, the links 33 of the lifter mechanisms 4 are shifted from the contracted state to the expanded state, and the rear end of the tilting lid 1 is lowered, the tilting lid 1 being thereby put into the fully closed state.

Since the guide means for guiding the roller provided on the side of the link for vertically moving the front end of the sliding lid in such a manner as to protrude therefrom is provided on one of the opposed surfaces of the side wall of the guide rail on the side facing the opening and the side wall thereof on the side facing the outside of the vehicle while the guide means for guiding the pin provided on the side of the link for vertically moving the rear end of the sliding lid in such a manner as to protrude therefrom is provided on the other opposed surface, one of the front and rear links is prevented from falling down to the side facing the opening, that is, to the side of the passenger compartment, while the other link is prevented from falling down to the side facing the outside of the vehicle, whereby the slide lid is stably supported at the front and rear ends thereof.

According to the first aspect of the invention, the longitudinal overall length of the vehicle sunroof device can be shortened, and this makes it possible not only to easily install the vehicle sunroof device in the roof but also to prevent the interference between the lifter mechanisms and internal mechanism parts disposed on the both sides at the front part of the roof.

In addition, the lifter mechanisms and the sliders can be driven by the single driving means, and this makes it possible to reduce the number of parts used. Moreover, while the sliders are being moved, the follower wires for the lifter mechanisms can be disengaged from the driving wires for driving mainly the sliders so as to concentrate the driving force of the driving means on the movement of the sliders by providing the interlocking means between the follower wires for the lifter mechanisms and the driving wires.

Not only is it possible to dispose the lifter mechanisms within a space limited in a longitudinal direction but also to lift the rear end of the tilting lid in smooth and secure fashions with the simple construction.

Further, it is possible to obtain a smooth and secure operation of the interlocking means, thereby making it possible to smoothly perform a series of opening and closing operations of the tilting lid and the sliding lid.

Still further, it is possible to securely fix the follower interlocking member to the guide rails at a position where the follower interlocking member is engaged and disengaged by providing the restraint plate on the follower interlocking member.

Still further, it is possible to simply form the arm portions and engagement portions using leaf springs, and it is also possible to reinforce the engagement portions so as to strengthen the engagement between the engagement portions and the engagement grooves, thereby making it possible to strongly hold the tilting lid at the tilt-up state.

Furthermore, not only is it possible to keep the overall height of the interlocking means low, while prolonging the length of the driving interlocking member in a longitudinal direction but also to prevent relative looseness between the driving interlocking member and the follower driving member to thereby obtain a stable operation of the interlocking means.

According to the second aspect of the invention, when the sliding lid is opened, since the front end of the sliding lid is lowered after it has evaded a rubber seal at the front edge of the opening in the roof, it is possible to prevent an earlier damage to the rubber seal that would otherwise be caused when the rubber seal is rubbed by the sliding lid. In addition, since the lifting and lowering operations do not happen simultaneously, a high load is not applied to the driving means at one time.

In addition, since the front and rear ends of the sliding lid can independently be lifted and lowered by the front and rear sliders, respectively, it is possible to provide easy control or to make simple the construction of the lifting mechanism.

According to the third aspect of the invention, looseness of the entirety of the slider including the roller, sliding body and link is prevented through a simple construction, thereby making it possible to obtain a smooth sliding movement of the sliding lid.

Further, according to the fourth aspect of the invention, since not only is it possible to set the entirety of the drain at as a low position as possible without any risk of the drain interfering with the side walls of the guide rails, but also to lower the both ends of the drain to a position near the side wall of the guide rail facing the outside of the vehicle, the overall thickness of the sunroof device can be reduced, whereby the height-wise dimension of the storing space can be reduced.

In addition, since the respective grooves of the guide rails and the sliding bodies of the sliders disposed in those grooves are covered with the side wall on the opening side are not exposed to the opening side, a good appearance, especially as viewed from the inside of the passenger compartment, can be provided.

And it is possible to allow the drain to be brought into engagement with the upper piece provided at the upper end of the side wall of the guide rail on the opening side without any risk of disengagement therefrom, and it is also possible to use the space formed below the upper piece as various types of guiding means such as a control groove for guiding the sliding member provided on the side of the link provided on the slider for lifting the sliding lid in such a manner as to protrude therefrom.

Still further, it is possible to incorporate various types of guiding means in the side wall of the guide rail facing the opening which is made higher than the other side wall.

According to the fifth aspect of the invention, since one of the front and rear links is prevented from falling down to the side facing the opening, that is, to the side of the passenger compartment by the guide means provided on the side wall of the guide rail on the side facing the opening, while the other links is prevented from falling down to the side facing the outside of the vehicle by the guide means provided on the side wall of the guide rail on the side facing the outside of the vehicle, the sliding lid is stably supported at front and rear ends thereof, and moreover, a good balance of loads applied to the front and rear lifter mechanisms and sliding mechanisms of the sliding lid can be provided, whereby especially the staggering of the sliding lid in the lateral directions can effectively be prevented.

Further, since various types of guiding means can be provided along the side walls of the guide rail in a vertically stacked fashion, it is possible to reduce the lateral width of the guide rail, whereby it is possible to expand an opening to an extent equal to the reduction in lateral width.

The entire disclosure of each and every foreign patent application from which the benefit of foreign priority has been claimed in the present application is incorporated herein by reference, as if fully set forth.

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. The vehicle sunroof device comprising:
  a guide rail disposed along an edge portion of an opening formed in a roof of a vehicle and having a substantially U-shaped cross section, said guide rail having a first side wall facing said opening and a second side wall facing an outside of said vehicle;
  a slider slidably fitted in said guide rail and moving in a longitudinal direction;
  a sliding lid supported by said slider so as to move between a fully closed position where said sliding lid closes said opening and a fully opened position where said sliding lid is lowered and slid rearward and stored below said roof;
  a drain slidably provided on said guide rail;
  wherein a guide groove for guiding said slider and a wire groove for allowing a wire connecting said slider and driving means to be put through a control groove for guiding a sliding member attached to said slider for activating a lifter mechanism for said sliding lid and an upper piece on which said drain is slidably mounted, are provided from a bottom in that order in said first side wall of said guide rail; and
  wherein said first side wall facing said opening is made higher than said second side wall facing the outside of said vehicle, and said drain is slidably attached to an upper end of said first side wall facing said opening.

* * * * *